3,579,424
MICROBIAL PRODUCTION OF CARBON 14C
LABELLED ALL-TRANS BETA-CAROTENE
Albert E. Purcell and William M. Walter, Jr., Raleigh,
N.C., assignors to the United States of America as represented by the Secretary of Agriculture
No Drawing. Filed Apr. 7, 1969, Ser. No. 814,526
Int. Cl. C12d 5/00
U.S. Cl. 195—28
4 Claims

ABSTRACT OF THE DISCLOSURE

Purified all-trans $^{14}$C beta-carotene has been prepared in multimilligram amounts with over three million $^{14}$C disintegration per minute per milligram. This process utilizes economical radioactive substrates more efficiently than processes of the prior art. Better than 1% $^{14}$C tagged atom goes into beta-carotene. The labeled ($^{14}$C beta-carotene) obtained can be used as a tracer in studies of autooxidation in food products and metabolisms of beta-carotene and vitamin A in animals.

---

A non-exclusive, irrevocable, royalty-free license in the invention herein described, throughout the world for all purposes of the United States Government, with the power to grant sub-licenses for such purposes, is hereby granted the Government of the United States of America.

This invention relates to $^{14}$C beta-carotene labeled products and to a process for producing these. Specifically, this invention relates to a novel process for the preparation of all-trans beta-carotene containing carbon-14 in large quantities. More specifically, this invention relates to a process for the microbial production of $^{14}$C labeled all-trans in controlled amounts from oil-free cottonseed powder and deodorized kerosene wherein the microbes are mated cultures of *Blakeslea trispora*. The labeled carotene obtained by the process of this invention can be used as a tracer in studies of autooxidation in food products and metabolic studies of beta-carotene and vitamin A in animals.

The main object of the instant invention is to provide a process for the preparation of all-trans beta-carotene containing carbon-14 in large quantities.

Another object of the instant invention is to provide a product with higher specific radio activity.

A third object is to provide a method of trapping radioactive metabolic carbon dioxide.

A fourth object is to provide simplification of techniques through new modification.

Further objects will be self-evident upon perusal of the specification.

All-trans beta-carotene is a member of a family of isoprenoid compounds called carotenoids. All-trans beta-carotene is made up of eight isoprenoid units, and contains eleven conjugated double bonds and two cyclic end groups. The molecular formula is $C_{40}H_{56}$. Beta-carotene is the natural precursor for vitamin A. Most mammals are able to convert all-trans beta-carotene into vitamin A, one molecule of all-trans beta-carotene giving two molecules of vitamin A. Since mammals are not able to biosynthesize vitamin A, all-trans beta-carotene is the main source of this necessary vitamin in mammals.

Vitamin A metabolism has been studied in many mammals. A cheap source of all-trans beta-carotene containing carbon-14, would provide a very powerful tool for vitamin A metabolism studies. Such a labeled beta-carotene would be useful in a study of decomposition of beta-carotene in complex mixtures such as foods and feeds.

Hasseltine et al. (U.S. Pat. No. 2,865,814) disclose a method for producing carotenoids employing combination of opposite mating types of different genera and/or species of a genus; however, this disclosure did not suggest the formation of all-trans beta-carotene, nor of the preparation of a radioactive beta-carotene.

Anderson in U.S. Pat. No. 2,890,989 discloses a process for producing beta-carotenoids employing microbiological techniques wherein microbes consisting of the (+) and (—) strains of *Blakeslea trispora*. Anderson produced beta-carotene, as was evidenced by this disclosure; however, the product thus obtained was not an all-trans product, nor was the product a labeled product.

The crux of the process of our invention lies in the ability to produce beta-carotene with sufficient radioactivity and in sufficient amounts to permit a whole new era of investigation employing radio-tracer techniques. Prior to our process it has not been feasible to obtain beta-carotene with sufficient label nor in sufficient amounts to be useful for studies of autooxidation in food products or the study of carotene and vitamin A metabolism in animals.

Lilly et al. in "A Method for Obtaining Pure Radio-Active Beta-Carotene With *Phycomycer Blakeleanus*," Mycologia 50: 862–873 (1958) teaches that many species of fungi synthesize carotenoids, but restricts discussion to the use of *Phycomyces Blakeleanus*, Burgeff, Lilly et al. used spore suspensions, and labeled the resulting carotene by means of a labeled sodium acetate, at a pH of 2.7 to 2.8. The process of the instant invention calls for the use of labeled sodium carbonate or labeled sodium acetate and a pH of 7.5 to 8.0. Furthermore, while Lilly et al. require 40 odd steps in preparing their C–14 labeled beta-carotene the process of the instant invention requires about 30 steps.

Some of the advantages of the process of the instant invention over the prior art are these: (1) a higher yield of beta-carotene is obtained, (2) higher specific radioactivity is obtained, roughly 3,000,000 disintegrations per minute (d.p.m.) compared to about 300,000 d.p.m. obtained in the prior art, (3) a method of trapping radioactive metabolic carbon dioxide has been provided, (4) procedures of the related art have been simplified by modifications in our techniques, and (5) a more efficient incorporation of the added label has been achieved for beta-carotene. Another definite and significant advantage has been achieved in that the production of beta-carotene has been enhanced by our use of *Blakeslea trispora*, since it devotes more of its metabolism to the production of beta-carotene than *Phycomyces blakesleanus*, which has been used in the prior art.

We have discovered that mated strains of *Blakeslea trispora*, a heterothallic mold, produce large quantities of all-trans beta-carotene in a unique fermentative process. Introduction of carbon-14 in the form of sodium carbonate or sodium acetate results in the production of all-trans beta-carotene of high specific radioactivity (a large number of the molecules containing atoms of carbon-14 in various positions within the all-trans beta-carotene molecules). The following examples illustrate a typical process performance.

In general the process of the instant invention can best be described thusly; it is an improved process for biosynthetically producing highly purified carbon-14 labeled trans beta-carotene of high specific activity, comprising:
(a) sterilizing two separate media vessels containing select quantities of Pharmamedia (a defatted cottonseed meal) and thiamine hydrochloride in water to yield preparations with high buffer capacity of a pH range of 7.5 to 8.0, said vessels being aseptically stoppered,
(b) preparing a plus and a minus culture of the mold *Blakeslea trispora* in potato-dextrose-agar slants, (c) seeding the separate media vessels of (a), one with the plus, the other with the minus culture of the slants of (b), (d) incubating each separately, shaking each on a rotary shaker for about 48 hours, (e) mating the plus and the minus *Blakeslea trispora* by transferring 5% portions of each into a sterile fermentation medium in an aseptic stoppered flask containing an incubation medium prepared by mixing select quantities of Pharmamedia, lard, deodorized kerosene, and thiamine hydrochloride, then incubating these by the method of step (d), (f) adding aseptically a select quantity of beta-ionone and a carbon-14 labeled radioactive substrate to provide about from 0.25 to 0.5 millicurie, stoppering the vessel, and providing the vessel with a carbon dioxide trap to capture whatever radioactive metabolic carbon dioxide is produced by the biosynthetic reaction.

(g) incubating the culture for not more than 72 hours to produce a relatively large yield of carbon-14 labeled trans-beta-carotene, (h) washing the product with methanol and filtering to produce a mycelial mat, (i) extracting the mycelial mat 3 times in a 1:1 acetone-hexane mixture using an efficient blender, (j) filtering and combining the filtrates from the 3 consecutive extractions, (k) washing the combined filtrates with water to remove acetone, (l) treating the washed hexane extract with a methanol-alkali hydroxide solution to remove saponifiable lipids then washing with water, (m) drying the hexane solution with anhydrous sodium sulfate and concentrating in a rotary evaporator under vacuum, (n) separating the product from contaminants by chromatographic techniques, and (o) purifying the product by crystallizing from a hexane-methanol mixture and finally from hexane to obtain a biosynthetically produced highly purified carbon-14 labeled trans-beta-carotene of high specific activity.

EXAMPLE 1

Inoculum: Plus strain of *Blakeslea trispora* grown on a potato-dextrose-agar slant is introduced aseptically into a sterile 500 ml. Erlenmeyer flask containing 150 ml. of a 7% aqueous suspension of oil-extracted cottonseed powder. The same procedure is followed for the minus strain of *Blakeslea trispora*. The strains are grown separately for 2 days at 28° C. on a rotary shaker operating at 220 r.p.m.

Fermentation: Five hundred ml. of a sterile 7% aqueous suspension of oil-free cottonseed powder and twenty-five ml. deodorized kerosene is put into a four liter Erlenmeyer flask equipped with an aseptic inlet for oxygen gas and an aqueous sodium hydroxide gas trap. Five percent of each inoculum is added aseptically to the fermentation flask. Oxygen gas is bubbled (15–20 ml. per minute) into the medium. Agitation is performed with a magnetic stirrer operating at 10 r.p.m. The fermentation proceeds for 48 hours at 22° C. At the end of this period 0.5 ml. of sterile beta ionone and 10 ml. of sterile sodium carbonate solution (sodium carbonate contained one millicurie of carbon-14) is added. The fermentation is allowed to proceed four days. After this time the temperature is raised to 29° C. and the fermentation allowed to proceed for three days.

Extraction and purification: Five hundred ml. of methanol and 100 gms. of celite powder is added to the fermentation flask, agitated and filtered. The mat is extracted repeatedly with acetone-hexane (50:50) until the extracts are colorless. Acetone is removed by washing with water and the hexane solution treated with 50 ml. of a saturated methanolic potassium hydroxide solution. The hexane solution is evaporated to 50 ml. and applied to the top of a 45 x 3 cm. chromatographic column packed with powdered celite-magnesium oxide (1:1) and eluted with 2% acetone in hexane. The carotene band is allowed to migrate half way down the column and is then extruded and the carotene extracted from the packing with the acetone-hexane solution. The solvent is evaporated and replaced with 100 ml. of dry ethyl ether. One-half gram of powdered lithium aluminum hydroxide is added and the mixture refluxed for 2 hours. The excess hydride is destroyed with acetone. The lithium aluminum hydride complex is destroyed with 5% aqueous sulfuric acid and the carotene extracted with hexane. The hexane solution is applied to a 45 x 3 cm. chromatographic column containing powdered celite-magnesium oxide (1:1). The column is developed with 2% acetone in hexane. The carotene is allowed to migrate half way down the column and then is removed, extracted with acetone-hexane, and the solvent evaporated. All-trans beta-carotene is recrystallized from hexane-methanol and then from hexane to constant specific activity. Crystallization to constant specific activity is the major criterion for radio chemical purity. In this way, 5.2 milligrams of all-trans beta-carotene containing 343,000 disintegrations per minute per milligram of beta-carotene is isolated. Since sodium carbonate (carbon-14) was the only source of radioactive carbon, it is assumed that the resulting all-trans beta-carotene is uniformly labeled.

EXAMPLE 2

A preferred (shortened) embodiment of the process: Mating cultures of *Blakeslea trispora* 2895 and 2896 were carried on potato-dextrose-agar slants (Difco brand commercial preparation). Each culture was seeded into 150 milliliters of sterile medium composed of 7.5 grams of Pharmamedia (a defatted cotton seed meal manufactured commercially) and 0.3 milligram of thiamine hydrochloride in 150 milliliters of water. The preparation had a fairly high buffer capacity with a pH range of 7.5–8.0. The medium was sterilized in 500 ml. Erlenmeyer flasks stoppered with cotton. Incubation was carried out in the same flasks on a rotary shaker at 200 cycles per minute at 28°–30° C. After 48 hours of incubation the separate cultures were mated by transferring 5% of each into 100 ml. sterile fermentation medium in a 500 milliliter Erlenmeyer flask stoppered with a cotton stopper.

The incubation medium was as follows:

Pharmamedia—7 grams
Lard—5 grams
Deodorized kerosene—5 milliliters (4.1 gm.)
Thiamine hydrochloride—0.2 milligram (0.002 gm.)

The mated cultures were incubated on a rotary shaker 200 cycles per minute at 28°–30° C. for 48 hours.

Sterile β-ionone 0.5 ml. and the radioactive substrate were added aseptically. Yields and specific activities obtained with various substrates were:

0.5 millicurie sodium acetate-1,2-$^{14}$C—20 mg. 3,000,000 d.p.m.
0.5 millicurie sodium carbonate-$^{14}$C—3.3 mg. 81,000 d.p.m.
0.25 millicurie glucose-U-$^{14}$C—13.8 mg. 97,000 d.p.m.

The cotton stopper was replaced with a stopper consisting of a one-half inch layer of cotton between layers of cheesecloth and sterilized in an empty flask. A pocket was formed as the sterile stopper was transferred to the incubation flask and the pocket was filled with ascarite to trap radioactive metabolic carbon dioxide. Incubation was continued for another 72 hours under the same conditions. Further incubation did not increase the yield of carotene or the radioactivity in the carotene.

After incubation was stopped, 150 milliliters of methanol and 5 grams of celite filter aid were added, and mixed. The contents of the flasks were filtered through a filter paper in a Buchner funnel and dried by tamping the mats. The dry mat was transferred to a Waring Blendor, mixed at high speed with 200 milliliters of acetone and 200 milliliters of hexane and filtered again. The last operation was repeated twice more. The combined filtrates were transferred to a separatory funnel. After a few minutes two distinct layers formed. The bottom layer was discarded and the upper layer was washed with water to remove the acetone. The remaining hexane extract was shaken with one fourth volume of methanol saturated with sodium hydroxide to remove saponification lipids. After saponification two distinct phases formed. The bottom phase was discarded and the upper was washed with water to remove the alkali.

The washed hexane extract was dried with sodium sulfate, concentrated to 100 milliliters under vacuum in a rotary film evaporator. The hexane concentrate was chromatographed on a 2 x 50 centimeter column of magnesium oxide and Hy-Flo Supercel 1:1/w.w. The column was developed until the large orange band of trans $\beta$-carotene was at the bottom of the column. All of the column above the main $\beta$-carotene band was carved out with a flattened rod and the $\beta$-carotene eluted into a clean receiver by adding an acetone-hexane mixture 1:1 to the column.

The $\beta$-carotene was purified by evaporating the solvents under vacuum in a rotary film evaporator and crystallizing the $\beta$-carotene once from hexane and methanol mixture and twice from hexane.

We claim:

1. An improved process for biosynthetically producing highly purified carbon-14 labeled trans beta-carotene of high specific activity, comprising:
    (a) sterilizing two 150 milliliter quantities in two separate media vessels each containing 7.5 grams of Pharmamedia (a defatted cottonseed meal) and 0.3 milligram of thiamine hydrochloride in 150 milliliters of water to yield preparations with high buffer capacity of a pH range of 7.5 to 8.0, the said vessels being aseptically stoppered,
    (b) preparing a plus and a minus culture of the mold Blakeslea trispora in potato-dextrose-agar slants,
    (c) seeding the separate media vessels of (a), one with the plus, the other with the minus culture of the slants of (b),
    (d) incubating each separately, shaking each on a rotary shaker at about 200 cycles per minute at 28°–30° C. for about 48 hours,
    (e) mating the plus and the minus Blakeslea trispora by transferring 5% of each into 100 milliliters of sterile fermentation medium in an aseptic stoppered flask containing an incubation medium prepared by mixing Pharmamedia, lard, deodorized kerosene, and thiamine hydrochloride, respectively, in a ratio of 7:5:4.1:0.0002, then incubating these by the method of step (d),
    (f) adding aseptically 0.5 milliliter of beta-ionone and a radioactive substrate selected from the carbon-14 labeled group consisting of:
        sodium acetate-1,2-$^{14}$C,
        sodium carbonate-$^{14}$C, and
        glucose-U-$^{14}$C
    any one of which provides about from 0.25 to 0.5 millicurie, then stoppering the vessel, providing said vessel with an efficient carbon dioxide trap to capture any radioactive, metabolic carbon dioxide produced by the biosynthetic reaction,
    (g) incubating the culture of step (f) by the method of step (d) for not more than 72 hours thereby biosynthetically producing about from 3 to 20 mg. of carbon-14 labeled trans-beta-carotene which yield about from 97,000 to 3,000,000 disintegrations per minute,
    (h) washing the product with methanol, filtering through filter-aid to produce a mycelial mat,
    (i) extracting the mycelial mat 3 times in a 1:1 acetate-hexane mixture using an efficient blender,
    (j) filtering and combining the filtrates from the 3 consecutive extractions,
    (k) washing the combined filtrates with water to remove acetone,
    (l) treating the washed hexane extract with a methanol-sodium hydroxide solution to remove saponifiable lipids then washing with water,
    (m) drying the hexane solution with anhydrous sodium sulfate and concentrating to 100 milliliters in a rotary evaporator under vacuum,
    (n) chromatographing in a column containing magnesium and Supercel in a 1:1 ratio,
    (o) retrieving the separated carbon-14 labeled trans-beta-carotene, and
    (p) purifying the product by crystallizing once from a hexane-methanol mixture and twice from hexane to obtain a biosynthetically produced highly purified carbon-14 labeled trans-beta-carotene of high specific activity.

2. The process of claim 1 wherein the carbon-14 labeled radioactive substrate employed in step (f) is sodium acetate.

3. The process of claim 1 wherein the carbon-14 labeled radioactive substrate employed in step (f) is sodium carbonate.

4. The process of claim 1 wherein the carbon-14 labeled radioactive substrate employed in step (f) is glucose-U.

References Cited

Lilly et al.: Mycologia, vol. 58, pp. 862–873 (1958).

ALVIN E. TANENHOLTZ, Primary Examiner

U.S. Cl. X.R.

252—301.1